UNITED STATES PATENT OFFICE.

JOSEPH E. KESELING AND CHARLES FUCHS, JR., OF NEW YORK, N. Y., ASSIGNORS TO THE PYROLITH COMPANY, OF NEW JERSEY.

COMPOSITION OF MATTER FOR ARTIFICIAL STONE.

SPECIFICATION forming part of Letters Patent No. 482,367, dated September 13, 1892.

Application filed December 21, 1891. Renewed July 20, 1892. Serial No. 440,639. (No specimens.)

*To all whom it may concern:*

Be it known that we, JOSEPH E. KESELING and CHARLES FUCHS, Jr., residing at New York, county and State of New York, have invented certain new and useful Improvements in a Composition of Matter for the Manufacture of Artificial Stone, of which the following is a specification.

Our invention relates to a composition of matter for the manufacture of artificial stone; and it consists of a basic cement of oxide of magnesium and chloride of magnesium, (as set forth in applications serially numbered 431,340 and 431,474,) to which are added asphaltum and a suitable filling material—such as sand—and diluting liquids.

We have found by experiments and tests that for some articles and purposes we can use a solution of caseine with the albumen solution. The caseine is cheaper that albumen, and by using it in a certain proportion with the albumen—say from twenty to forty per cent. of caseine solution to eighty to sixty of the albumen solution—a diluting liquid is obtained which gives good results. In articles of low elasticity and heat conducting—such as coating material—we can profitably use the caseine solution in connection with the albumen. It is understood that a certain elasticity and tenacity is given to the material by the asphaltum. By the addition of the albumen and caseine solution we can make the composition sufficiently fluid to flow freely from a brush, or if a less amount of the solution be used it will be rendered more paste-like and suitable as a mortar. The sand is added in greater or less quantities, by weight, according to the purpose required, and may, therefore, vary from fifty to ninety per cent. The use of the cheaper and weaker solution of caseine with the albumen does not prevent our using suitable pigments to obtain a desired color in the composition. We have found that if the caseine was used alone as a dilutant or if in excess of the albumen the material became brittle, but when used in about the proportions stated the material gave good results and at less cost than if albumen was used.

Having described our invention, what we claim is—

The herein-described composition of matter for the manufacture of artificial stone, which consists of a basic cement of chloride and oxide of magnesium, sand or analogous filling material, a solution of asphaltum, and a solution of albumen and caseine.

JOSEPH E. KESELING.
CHARLES FUCHS, JR.

Witnesses:
J. R. H. THOMPSON,
ROBERT S. HUNTER.